April 18, 1939.　　　J. E. PADGETT　　　2,154,991
FLEXIBLE COUPLING
Filed May 25, 1937　　　2 Sheets-Sheet 1
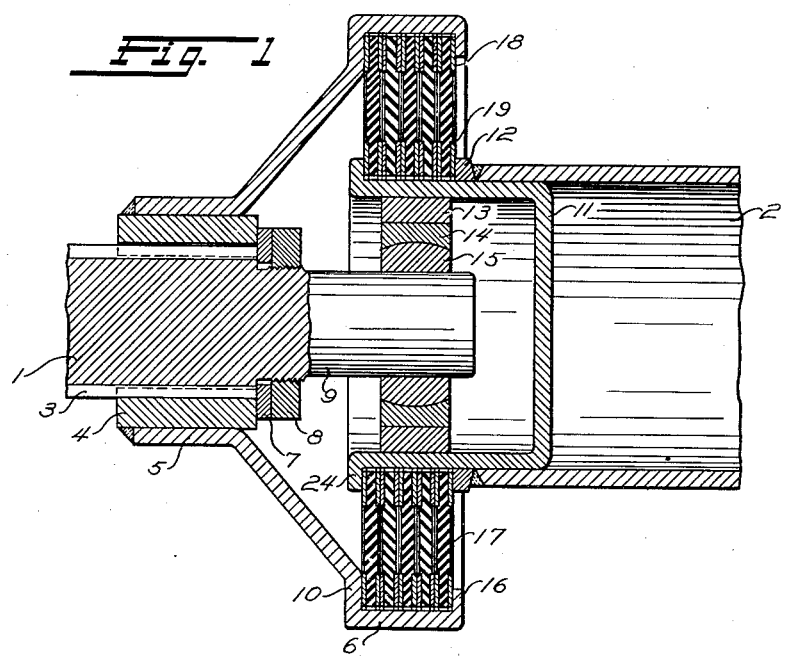
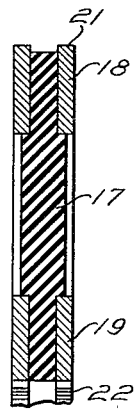
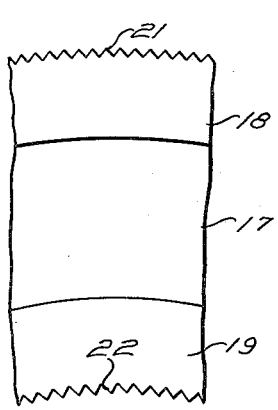
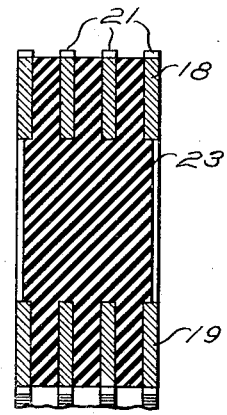
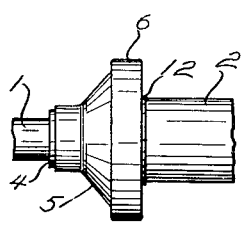
Inventor
Joseph E. Padgett
By Strauch & Hoffman
Attorneys April 18, 1939.　　　J. E. PADGETT　　　2,154,991
FLEXIBLE COUPLING
Filed May 25, 1937　　　2 Sheets-Sheet 2
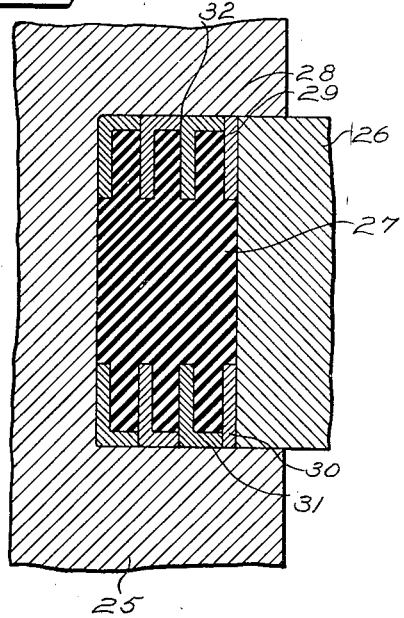
Fig. 6
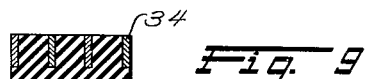
Fig. 9
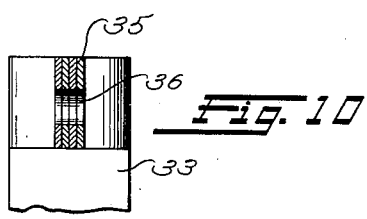
Fig. 10
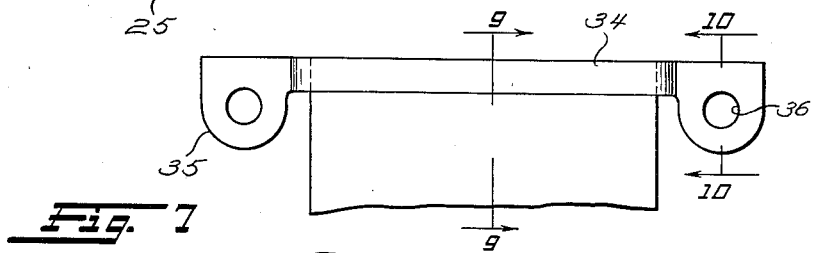
Fig. 7
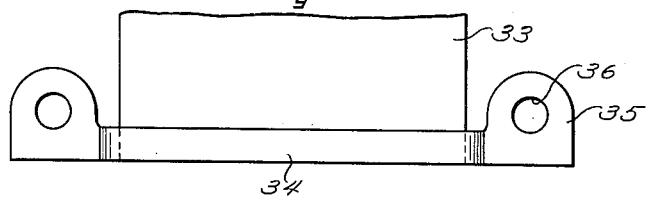
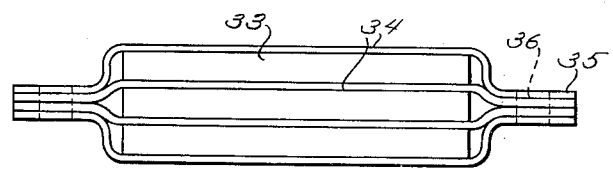
Fig. 8
Inventor
Joseph E. Padgett
By Strauch & Hoffman
Attorneys Patented Apr. 18, 1939

2,154,991

UNITED STATES PATENT OFFICE 2,154,991

FLEXIBLE COUPLING

Joseph E. Padgett, Toledo, Ohio

Application May 25, 1937, Serial No. 144,709

25 Claims. (Cl. 64—11)

My invention relates to flexible connections and methods of making the same, and more particularly to flexible couplings or supports employing rubber or the like.

My invention is not limited to any particular type of flexible coupling or support, but since a preferred embodiment as in a driving coupling to be described later is a universal joint, a brief discussion of the problems involved in such joints will be given as illustrative in part of the problems involved in flexible couplings or supports in general.

The use of rubber in universal joints of the prior art has been confined to two general classes of structure. In one type, metal pins or arms fixed to yokes are arranged to work in rubber balls, blocks, bushings, or the like enclosed in metal housings. In such structures the rubber is subjected to undesirable compression stresses and consequently becomes badly worn through rubbing where the metal pins or arms contact the rubber. Also since the rubber is enclosed over a great portion of its surface by a metal housing, such joints have limited torsional elasticity, which is undesirable in that it limits the angular deviation between the connected members.

Another form of universal joint suggested by the prior art is that in which an annular fabric and rubber disk, or a plurality of such disks, compressed and fastened concentrically, are secured at spaced points, usually by bolts, to yokes or spiders extending on either side from the drive and driven shafts, respectively. While this construction is fairly satisfactory for extremely low speeds and in assemblies where balance is not overly important, it is not suitable to meet the demands of the higher speed engines of today which not only produce higher shaft speeds but require that proper balance of parts be maintained to prevent excessive vibration and wear.

Another difficulty encountered in this type of universal joint is rapid wear and short life when the angularity between the drive and driven shafts is high. This undesirable feature is due mainly to the fact that the fabric and rubber composition used in the disks is fundamentally not elastic, does not stretch uniformly, and develops unevenly distributed stresses when transmitting power with the shafts angularly disposed.

Recent developments in power transmission systems, especially in motor driven vehicles, have resulted in higher engine speeds and a demand for elimination of excessive wear and vibration in the system employed to transmit power from the engine to the wheels. Also certain body designs necessitate the use of high shaft angularity at the universal joints. Other problems have arisen in the support of the engines in said vehicle to eliminate the transmission of engine vibrations from the engine to the vehicle body.

In solving the problems arising from the above modern demands and in remedying the above pointed out defects in the prior art, it is a major object of my invention to provide a novel flexible connecting means that will operate efficiently under all conditions for a long period of time by reason of the novel structure wherein the stresses are imparted to the resilient material employed in a manner to reduce the unit stress thereon to a minimum.

It is another major object of my invention to provide a novel flexible connection which will, when embodied in a universal joint, operate efficiently at high speeds and high shaft angularity while at the same time maintaining perfect balance to prevent vibration.

Another major object of my invention is to provide a novel flexible connection in which live rubber without fabric is used to insure high and uniform elasticity and uniform flexibility of the coupling.

A further object of my invention is to provide a novel flexible connection which includes resilient means having large surface areas bonded securely to separate rigid elements adapted to be connected to members on either side of the connection. In such a structure the bonded areas are subjected to shear stresses only and a rigid connection is secured between the resilient means and the members. The bonded areas may thus be increased to a maximum to reduce the unit stress to a minimum.

It is a further object of my invention to provide a novel flexible connection in which bonded resilient and rigid means are assembled in such a manner that the members connected together transmit driving loads only through their contact with the rigid means, a completely free elastic area is provided, and the bonded surfaces between the means are subjected to shear stresses only.

A further object of the invention is to provide a novel flexible connection in which resilient means, such as rubber, has fixed thereto, as by vulcanizing over large areas of contact, metal elements which are adapted to be secured to the connected members so that a secure mechanical connection is effected between the resilient means and the members.

A further object of my invention is to provide a novel flexible coupling in which a ring of flexible material has fixed thereto, adjacent the inner and outer circumferences, rigid elements adapted to be connected to the coupled members so that that connection bears substantially all the driving load stresses while the flexible material at those connections is substantially free from such stresses.

A further object of my invention is to provide a novel flexible coupling in which a plurality of flexible rings have fixed thereto, adjacent their inner and outer circumferences, rigid elements adapted to be connected to the coupled members and arranged concentrically and compressed axially to form a substantially unitary disk-like element.

A further object of my invention is to provide a novel flexible coupling in which resilient means, combined with rigid portions adapted to contact the coupled members, are employed so that the resilient material is not subjected to stresses through contact with the coupled members.

A further object of the invention is to provide a novel disk-like unit for use in flexible couplings in which an annular ring of resilient material has fixed thereto a plurality of separate rigid members adapted to be connected to the members to be coupled so that no portion of the resilient material need be subject to driving load bearing contact directly with the coupled members, the rigid members operating as the connecting means.

A further major object of my invention is to provide a novel flexible coupling that may be used in a universal joint in which two shafts are each connected by flexible means and in which the two shafts have a further auxiliary universal connection such as a ball and socket joint to assist in maintaining the shafts in predetermined relation.

A further major object of my invention is to provide a new method of making a flexible connection of the type using resilient material in which the resilient material is provided with rigid portions adapted to be connected to the members to be connected in order to effect a secure mechanical connection between the resilient material and the members.

A further major object of my invention is to provide a new method of making a flexible connection between two metal members in which elements are vulcanized to separate portions of a rubber coupling unit and the rigid elements are securely fixed to the metal members so that a secure mechanical connection is effected between the members and the rubber coupling unit and a free elastic area of rubber is provided.

A further major object of my invention is to provide a novel flexible coupling, as in a universal joint, in which all forces are symmetrical about the coupling to insure balance and an absence of vibration during rotation.

A further major object of my invention is to provide a novel flexible coupling such as a universal joint in which the driven member, if unbalanced, will tend to find and rotate about its center of gravity rather than the geometrical center of the coupling, resulting in a smooth, vibrationless operation.

A further object of my invention is to provide a novel flexible connection such as a vibration absorbing mounting between two relatively movable members in which a plurality of rigid elements adapted to be secured to the members are securely bonded over very large contacting surface areas to flexible material in such a manner that the bonded surfaces are subjected to shear stresses only and the unit stress is reduced to a minimum.

Further objects of the invention will become apparent as the description proceeds in connection with the accompanying drawings in which like parts are designated by like reference characters.

Figure 1 is a horizontal section of a preferred form of the invention illustrating the structural arrangement of the flexible elements with relation to the drive and driven members in a universal joint.

Figure 2 is an enlarged end view of a section taken across a portion of one of the flexible elements of Figure 1 and illustrating the arrangement of the rigid elements thereupon.

Figure 3 is an elevation of a part of the flexible element of Figure 2.

Figure 4 is an enlarged end view similar to Figure 2 of a section taken across a portion of a flexible member illustrating a preferred modification of the invention in which a single thick flexible element is employed instead of the several flexible elements as in Figure 1.

Figure 5 is an elevation on a reduced scale illustrating a preferred shape of connecting member used in Figure 1.

Figure 6 is a section showing a portion of a flexible member, similar to that of Figure 4 but with a different type of rigid element, in the process of being molded.

Figure 7 is an elevation of a vibration absorbing mounting illustrating a further preferred embodiment of the invention.

Figure 8 is a top plan of the mounting of Figure 7.

Figure 9 is a section taken on line 9—9 of Figure 7 illustrating the arrangement of the rigid elements with respect to the flexible member.

Figure 10 is a section on line 10—10 of Figure 7 illustrating how the rigid members are collectively fastened to the members connected.

A universal joint used for purposes of illustrating a preferred form of the invention will now be described in detail. Numerals 1 and 2 designate two shafts or members which are to be coupled. Shaft 1, preferably a transmission shaft, is splined at 3. Slidably mounted upon shaft 1 at the splined portion thereof is a hub 4 to which is fixed by any suitable securing means, preferably as by welding, a connecting member 5 of generally truncated conical form as shown in Figure 5. Member 5 is formed by any suitable operation, such as by stamping, from steel or any other suitable material, and preferably is formed to provide a collar about hub 4 where it is attached to the hub. From this collar, a member 5 flares outwardly and in this flared portion may be formed a solid ring or spaced lugs. The outer end of member 5 is formed with a flanged portion at 6, the purpose of which is later to be described.

Hub 4 is fixed to member 1 by suitable means such as washer 7 and cooperating nut 8 fitted upon a threaded region at the reduced end 9 of shaft 1.

Shaft 2, to be known as the central shaft hereinafter, is preferably hollow. Connecting member 11, substantially cup-shaped and formed in the same manner as member 5 above, is fixed by any suitable means, as by welding, to the interior of shaft 2. A raised annular shoulder 12 surrounds a member 11 at the end of shaft 2 and is preferably welded to member 11 and shaft 2. This shoulder has a flat inner face lying in a plane perpendicular to the axis of shaft 2.

The flexible means shown in Figure 1 comprises a plurality of concentric units each having a flat, substantially annular disk 17 made of rubber or other suitable flexible or resilient material. Figure 2 is an enlarged cross-section of a portion of one of these units. Each disk 17 is preferably provided on each side with a rigid, thin, flat, metal concentric disk 18 secured adjacent the outer circumference of the disk and a rigid, thin, flat, metal concentric disk 19 secured adjacent the inner circumference of the disk. Preferably, as shown Figure 2, the outer flat surface of each metal disk on each side of the flexible disk 17 lies in a plane parallel to but spaced slightly axially from the surface of the flexible disk at that side for a purpose to be described later.

The preferred shape of the resilient means used in the invention is annular or substantially annular because in such a structure even distribution of forces is more easily obtained. By the term substantially annular I mean that the peripheries need not be exactly circular since practically any polygonally shaped plate of flexible material can be used.

Metal disks 18 and 19 may be bonded to flexible disk 17 in any suitable manner depending upon the materials used. Preferably, when disk 17 is live rubber, the bonding process is as follows. Thin steel disks 18 and 19, which resemble ordinary washers, are placed in a mold in spaced concentric relation with their surfaces parallel. The steel disks are preferably brass plated beforehand so that proper vulcanization with the rubber can be obtained. Rubber is then molded into place between the metal disks, vulcanized and cured. It will be noted that there is a very large area of surface contact between each metal disk and the rubber disk and the purpose of this will be described later.

As shown in Figure 3, each metal ring or disk 18 is preferably provided with a serrated or otherwise roughened outer periphery 21, and each metal ring 19 is preferably provided with a serrated or otherwise roughened inner periphery 22 for a purpose to be later described. Each of these roughened portions preferably projects a short distance beyond the adjacent rubber surfaces as shown in Figure 2 and are preferably formed by machining or by some other suitable operation after the molding operation has been effected. If desired, both the serrated surfaces and the rubber surfaces may extend to the peripheries of the assembly and the manner of operation of the assembly will not be changed as will be hereinafter shown.

In a preferred and relatively inexpensive method of assembling the coupling, several of the flexible units are slid over the open end of member 11 until the first disk 19 abuts the flat face of shoulder 12. The number and size of the flexible units used is determined by the nature and amount of stresses to which the coupling is to be subjected. The open end of the member 11 is then bent over and outwardly by a suitable operation such as spinning and a lip 24 is formed which abuts against the outermost disk 19 in a manner to tightly compress the disks between the shoulder 12 and lip 24.

Inside the cupped portion of member 11 is mounted a support 13 upon which is mounted a suitable socket 14 carrying cooperating bearing member 15 in the form of a spherical-faced collar functioning as a ball. Ball 15 has a central hole in which the reduced end 9 of shaft 1 is slidably positioned. Suitable means for sealing and lubricating this sliding ball and socket joint are used but such have not been shown here because it does not constitute part of the invention, only the essentials of a suitable universal connection being included. With the reduced end 9 in position, connecting member 5 is bent and formed by a suitable operation such as spinning to enclose the outer portions of metal disks 18, the lip 16 being formed to abut against the outermost disk 18 as shown in Figure 1.

Referring to Figure 1, particularly, it will be noted that when assembled the flexible units are compressed axially between lips 24 and shoulder 12 and also between lip 16 and portion 10 of member 5. Serrated edges 21 and 22 contact the inner surface of member 5 and the outer surface of member 11, respectively. This serrated surface contact and the above mentioned axial compression combine to form a secure mechanical connection to the metal connecting members 5 and 11. Although the resilient material may or may not contact the members 5 and 11, it will be noted that any such contact is not relied upon to, and in fact does not, bear any driving load stresses. All of those stresses are borne by the rigid contacts between the rigid elements and the members 5 and 11. Obviously other suitable connections between the metal disks 18 and 19 and the connecting members 5 and 11 respectively can be made without departing from the spirit of the invention.

It is to be noted that in this construction, a large area of each metal disk is securely bonded to a flexible disk as explained above, and this bond is materially assisted by the fact that the disks are axially compressed. If the rigid elements of my invention were eliminated and rubber disks 17 were attached directly to members 5 and 11 for the purpose of carrying drive load stresses, they would be subjected to high tension stresses tending to pull the rubber-metal bond apart during driving torque. No such tension stresses exist in my structure described above in which the rubber to metal bonded surfaces are subjected to shear stresses only.

It will be seen therefore that a flexible coupling made as described above will have positive metal to metal contacts with the members to be coupled during all load conditions since the metal disks 18 and 19 are rigid and will not expand or contract when subjected to driving loads. Secondly, in such a coupling, the metal disks bonded to the flexible disks are subjected to shear stresses only at the bonded surfaces, and that bonded surface area is amply large enough to take care of any such stresses due to applied load. Attention is especially directed to the large surface areas over which the stresses at the bonded surfaces are distributed in my invention. This substantially laminated structure will allow much greater area of bond than would be possible if the flexible portion were directly secured to the members connected. Thus since the total stress is distributed over a greater area the unit stress at each portion of the bonded area is quite low in my construction and is maintained at a minimum. Thirdly, between the compressed differential areas is a completely free flexible portion which is subjected to substantially only tension stresses when torque is applied. This portion is amply strong and very efficient because resilient materials such as rubber and the like have longer life and operate more satisfactorily under tension stresses than under any other kind of stresses.

In the modification of Figure 4 is shown a unit which can be used instead of the plurality of individual flexible units shown in Figure 1. Instead of a plurality of thin flexible disks 17, a single thick disk 23 of suitable resilient material such as rubber has molded into it and vulcanized thereto a plurality of spaced metal rings 18 and 19. These metal rings are arranged in the same manner as described above in connection with Figure 1 and the flexible unit of Figure 4 is designed to be clamped between members 24 and 12 and 10 and 16 in Figure 1 where it acts in the flexible coupling exactly as do the axially compressed smaller flexible units described above.

The main advantage derived in using the thick solid rubber ring 23 is that its very thickness gives it a structural value which tends to prevent surface wrinkles when torque is applied. In the modification of Figure 1 where several thinner flexible rings are used, surface wrinkles may tend to form on the same under unusual conditions of torque. These wrinkles rub against wrinkles on the surface of the adjacent flexible ring causing excessive heat and wear. However, either modification is suitable for ordinary torque conditions.

In Figure 6 is illustrated a further preferred method of forming a unit such as shown in Figure 4. The use of flat rigid elements such as 18 and 19 in Figure 4 sometimes results in buckling of the elements when very high pressures are used in the molding operation. This buckling under high pressure can be eliminated by using elements having projecting portions or flanges tending to contact and support the succeeding element when pressure is applied.

In Figure 6 the recessed mold body 25 and mold plunger 26 cooperate to compress and bond together resilient member 27 and a plurality of relatively thin rigid elements 28, 29, 30 and 31. Elements 29 and 30 are quite similar to elements 18 and 19 of Figure 4. Elements 28 and 31 however are substantially L-shaped or cup-shaped so as to provide a projecting portion or flanges for contacting and supporting an adjacent element when pressure is applied to the mold. These rigid elements may be even welded at the contacting portions, generally designated at 32, if desired, or if necessary to aid in the supporting function and to prevent relative displacement during molding. The outer surfaces of the rigid elements are then machined to provide serrated or slotted contact surfaces as previously described.

A flexible coupling constructed in accordance with the invention will maintain proper balance because all of the forces are symmetrical about the center of the coupling. In this construction, even when the central shaft is unbalanced, it tends to seek and rotate about its center of gravity rather than about the center of the coupling, thus promoting smoother operation.

A main advantage of the auxiliary ball and socket joint is its action as a centralizing member for the central shaft in assemblies where the flexible element is not properly centered. This auxiliary joint is not necessary in all forms of the invention especially where the central shaft tends to rotate about its own center of gravity.

This invention as applied to any universal joint renders it extremely flexible and satisfactory in life and general performance even where the shaft angularity is high and high speed operation is encountered.

It is to be understood however that this invention is not limited to universal joints, such being described above in detail only to illustrate a preferred embodiment of the invention. The present invention is applicable to all types of connections or supports where flexible and rigid elements, especially rubber and metal elements, are employed. The principle of interposing, between rigid members and a flexible member to be connected therebetween, a plurality of rigid elements securely bonded over a large surface area to the flexible member and provided with suitable attachments to the rigid members, with a large area of the flexible member free and subjected only to tension stresses, can be applied to many other types of flexible couplings or supports as will be described in connection with Figures 7-10, inclusive.

The vibration absorbing support of Figures 7-10 is a further preferred embodiment of my invention and may be used as an engine support in motor vehicles. Flexible member 33 has attached thereto at each end by a suitable operation such as the molding and vulcanizing processes above described, a plurality of relatively thin rigid and preferably metal elements 34. As illustrated in Figure 8, elements 34 at each edge extend beyond member 33 and are bent, compressed and secured together by a suitable operation such as welding to form eared portions generally indicated at 35. Preferably there will be four of these eared portions 35 and they preferably lie substantially in the same plane.

Apertures 36 are provided in ears 35 for securing them to members to be connected. For example, if the device of Figure 7 is used as an engine mounting, lower ears 35 would be bolted or secured in some equivalent manner to a base while upper ears 35 would be suitably secured to a rigid part of the engine. Obviously other securing means than the apertured ears 35 can be used to connect elements 34 to the members to be connected without departing from the spirit of the invention.

It will be obvious that my invention is not limited to the constructional features and methods disclosed for the purposes of illustration.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A disk unit for use in flexible couplings comprising a substantially annular pair of flat resilient rings, flat rigid rings securely bonded on opposite sides of said resilient ring adjacent the outer circumference thereof, a second pair of flat rigid rings spaced a substantial distance radially from said first rigid rings and securely bonded on opposite sides of said resilient ring adjacent the inner circumference thereof, the outer surfaces of each rigid ring on each side of the resilient ring lying in a plane spaced axially from the surface of the resilient ring on that side.

2. A disk unit of the type recited in claim 1 in which the rigid rings are secured in shoulders on the resilient ring.

3. In a flexible connection or support for interconnecting two relatively movable members, resilient means disposed between the members, two groups of rigid elements securely bonded to separate portions of said resilient means, each group being provided with means for securing it to one of said members, some of said rigid members of each group being substantially embedded in said resilient means whereby an extremely large surface area of contact is provided and an area of free resilient material is maintained between the bonded areas.

4. In a vibration absorbing support for engine mountings and the like, a block of flexible material and a plurality of relatively flat strips of metal substantially imbedded in said flexible material and extending beyond the edges of said flexible material, means for securing together the ends of said strips at each side of said material to provide eared portions, said eared portions being adapted to be connected to and move with a vibrating member.

5. A flexible connection or support for use between a plurality of members comprising resilient means, a plurality of metallic elements fixed to said resilient means in spaced relation and in such a manner that a substantially large surface area of each metallic element is closely bonded to a surface of said resilient means and a free area of resilient material is provided for taking tension stresses, means for securing a group of said metallic elements to one of said members, and means for securing another group of said metallic elements to another member said free area of resilient material being disposed between said groups of elements.

6. The flexible connection recited in claim 5 in which the resilient means is rubber vulcanized to the metal elements.

7. In a flexible drive torque transmitting connection between a drive member and a driven member, a rubber annulus disposed between the members, and rigid interconnecting means between each member and the rubber annulus, said means comprising a plurality of thin flat metal elements having relatively large surface areas vulcanized directly to the inner and outer peripheries on both sides of said annulus in such a manner as to provide a wide free elastic area of rubber between the inner and outer peripheries of said annulus.

8. In a flexible connection or support for interconnecting two relatively movable members, resilient means having freedom for elastic movement in all directions disposed between said members, a group of a plurality of thin metal elements, each having a large portion of the surface areas thereof securely bonded to a portion of said resilient means, a second group of a plurality of thin metal elements, each having a large portion of the surface areas thereof securely bonded to a spaced portion of said resilient means, and means for securing each of said groups to one of said members.

9. In the flexible connection or support recited in claim 8, said resilient means being rubber and the secure bond being effected by vulcanizing.

10. In a flexible connection between two angularly displaceable shafts, an annular resilient ring disposed between said shafts, a plurality of annular metal rings securely bonded to the outer periphery of said resilient ring, a plurality of annular metal rings securely bonded to the inner periphery of said resilient ring, a collar slidably mounted on one of said shafts and secured to one group of said metal rings, and means for securing the other group of metal rings to the other shaft.

11. In a flexible coupling for connecting a drive member and a driven member, a plurality of flat concentric substantially annular rubber rings, all of substantially the same size, disposed axially between the members, a plurality of thin flat metal rings vulcanized to each of said rubber rings on opposite sides at the inner and outer peripheries thereof, means for connecting the metal rings at the inner periphery of said rubber rings to one of said members, and means for connecting the metal rings at the outer periphery of said rubber rings to the other member, said connections including means for maintaining said rings under axial compression to provide a compact multiple layer unit.

12. A disk unit for use in flexible couplings comprising a substantially annular block of flexible material, a plurality of concentric rigid rings arranged in grooves about the outer periphery of said block and projecting outwardly therefrom, and a plurality of concentric rigid rings arranged in grooves about the inner periphery of said block and projecting inwardly therefrom.

13. A disk unit for use in flexible couplings comprising a substantially annular block of resilient material, a plurality of flat concentric metal rings arranged in axially spaced grooves about the outer periphery of said block and a plurality of flat concentric metal rings arranged in axially spaced grooves about the inner periphery of said block, each of said rings having those surface areas contacting said block securely bonded thereto.

14. A flexible coupling for transmitting driving torque between a rotatable drive member and a rotatable driven member comprising a resilient annulus between said members and rigid interconnecting means between each of said members and said resilient annulus, said means having large surface areas securely bonded to the inner and outer peripheries at both sides of said annulus whereby said bonded surfaces are subjected substantially to shear stresses only during rotation of said members.

15. A flexible coupling for transmitting driving torque between a rotatable drive member and a rotatable driven member comprising resilient means disposed between said members, rigid means securely bonded over large surface areas to one portion of said resilient means and connected to said drive member, and rigid means securely bonded over large surface areas to another portion of said resilient means radially spaced from said first portion and connected to said driven member, said bonded areas substantially all lying in planes substantially transverse to the axis of rotation of said coupling whereby said bonded areas are subjected substantially to shear stresses only during rotation of said members.

16. In the flexible coupling of claim 15, said resilient means being composed entirely of live rubber and said rigid means being made of metal vulcanized to said rubber.

17. A universal joint for transmitting driving torque between two angularly displaceable shaft members comprising a substantially annular rubber plate disposed between said members, rigid means vulcanized to an outer lateral portion of said rubber plate and attached to one of said members, and rigid means vulcanized to an inner radially spaced lateral portion of said rubber plate and attached to the other of said members whereby a large area of free rubber having freedom for elastic movement in all directions is provided between said rigid means.

18. A flexible coupling for transmitting driving torque between a rotatable drive member and a rotatable driven member comprising a resilient ring disposed between said members, a substantially flat rigid ring concentric with said resilient ring and having a lateral surface securely bonded thereto adjacent the outer circumference, a second substantially flat rigid ring concentric with said resilient ring and having a lateral surface securely bonded thereto adjacent the inner circumference and on the same side as said first rigid ring, and means for securing each of said rigid rings to one of said members, said resilient ring being formed of a material elastic in substantially all directions.

19. In a flexible coupling for connecting a drive member and a driven member, a plurality of concentric flat flexible rings, a plurality of flat rigid outer rings and a plurality of flat rigid inner rings permanently bonded upon each flat side of each of said flexible rings in such a manner as to project laterally therefrom, means for maintaining said outer rigid rings under axial compression and securing them to one of said members, and means for maintaining said inner rigid rings under axial compression and securing them to the other of said members.

20. In the flexible coupling of claim 19, said last-named securing means comprising a rigid annulus mounted upon each of said members and a serrated portion on each rigid ring engaging one of said annuli.

21. An intermediate unit for use in flexible connections comprising a block of resilient material, a group of a plurality of spaced metal strips secured in substantially parallel grooves extending along one edge of said block, a second group of a plurality of spaced metal strips secured in substantially parallel grooves extending along an opposite edge of said block, and means providing separate access to each of said groups for rigidly attaching the same to other elements of the flexible connection.

22. A coupling comprising spaced, concentric, metallic members, a plurality of interposed, comparatively thin, rubber rings, and a plurality of rigid rings adjacent the inner and outer peripheries of said rubber rings and vulcanized to the sides thereof to provide a comparatively large surface union therebetween, said inner and outer rigid rings being secured respectively to said metallic members, and said rubber rings having intermediate portions free of said rigid rings to provide a comparatively large volume of freely distortable rubber between said metallic members.

23. A coupling adapted to be subjected to torsional stresses comprising spaced, concentric, metallic members having opposed annular flanged faces, a plurality of interposed resilient rings, and pairs of flat rigid rings bonded to each side and adjacent the inner and outer peripheries of each of said resilient rings, said inner and outer rigid rings being secured respectively to said metallic members, the portions of said resilient rings embraced by said rigid rings providing comparatively large surface areas for the bond to compensate for torsional stresses imparted thereto, and the intermediate zones of said resilient rings providing comparatively large areas of free resilient material between said metallic members.

24. A coupling comprising spaced, concentric, metallic members having opposed annular flanged faces and an interposed resilient ring having pairs of flat rigid rings vulcanized to each side and adjacent the inner and outer peripheries thereof, said inner and outer rigid rings being secured respectively to said metallic members, and the portions of said resilient ring embraced by said rigid rings being maintained under axial compression by said metallic members.

25. A coupling comprising spaced, concentric, metallic members having opposed annular flanged faces and an interposed resilient ring having a plurality of inner and outer peripheral recesses within which are vulcanized flat rigid rings, said inner and outer rigid rings being secured respectively to said metallic members, and the portions of said resilient ring between said rigid rings being maintained under axial compression by said metallic members.

JOSEPH E. PADGETT.

CERTIFICATE OF CORRECTION.

Patent No. 2,154,991. April 18, 1939.

JOSEPH E. PADGETT.

It is hereby certified that error appears in the printed specification of the above numbered patent requiring correction as follows: Page 3, second column, line 59, and page 4, first column, lines 9 and 10, for "exible" read flexible; same page 4, second column, line 66, beginning with "A disk unit" strike out all to and including the word and period "side.", page 5, first column, line 3, comprising claim 1, and insert instead the following -

> A disk unit for use in flexible couplings comprising a substantially annular flat resilient ring, a pair of flat rigid rings securely bonded on opposite sides of said resilient ring adjacent the outer circumference thereof, a second pair of flat rigid rings spaced a substantial distance radially from said first rigid rings and securely bonded on opposite sides of said resilient ring adjacent the inner circumference thereof, the outer surfaces of each rigid ring on each side of the resilient ring lying in a plane spaced axially from the surface of the resilient ring on that side. ;

page 5, first column, line 31, claim 5, for "pluraity" read plurality; and that the said Letters Patent should be read with this correction therein that the same may conform to the record of the case in the Patent Office.

Signed and sealed this 30th day of May, A. D. 1939.

Henry Van Arsdale (Seal)   Acting Commissioner of Patents.